(12) United States Patent
Tassinari et al.

(10) Patent No.: US 8,214,680 B1
(45) Date of Patent: Jul. 3, 2012

(54) POE POWERED MANAGEMENT CIRCUITRY USING OUT-OF-BAND DATA PORT

(75) Inventors: Mark A. Tassinari, Loomis, CA (US); Jeffrey L. Fowler, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 647 days.

(21) Appl. No.: 12/370,209

(22) Filed: Feb. 12, 2009

(51) Int. Cl.
*G06F 1/26* (2006.01)

(52) U.S. Cl. .................................. 713/340; 713/330

(58) Field of Classification Search .......... 713/300–340; 710/260–269
See application file for complete search history.

(56) References Cited

U.S. PATENT DOCUMENTS

| | | | |
|---|---|---|---|
| 7,046,983 B2 * | 5/2006 | Elkayam et al. | 455/402 |
| 7,230,412 B2 | 6/2007 | Stineman, Jr. et al. | |
| 7,340,620 B2 * | 3/2008 | Dove | 713/300 |
| 7,373,528 B2 * | 5/2008 | Schindler | 713/300 |
| 7,454,641 B2 * | 11/2008 | Connor et al. | 713/324 |
| 7,455,527 B2 | 11/2008 | Nordin et al. | |
| 7,457,262 B1 | 11/2008 | Doshi et al. | |
| 7,478,251 B1 | 1/2009 | Diab et al. | |
| 7,549,067 B2 * | 6/2009 | Tolliver | 713/320 |
| 7,685,440 B2 * | 3/2010 | Blaha et al. | 713/300 |
| 7,756,267 B2 * | 7/2010 | Diab et al. | 379/413 |
| 7,774,628 B2 * | 8/2010 | Hansalia | 713/320 |
| 7,886,165 B2 * | 2/2011 | Khan et al. | 713/300 |
| 7,941,677 B2 * | 5/2011 | Penning | 713/300 |
| 2006/0233113 A1 | 10/2006 | Mendoza et al. | |
| 2007/0162620 A1 * | 7/2007 | Terry et al. | 709/253 |
| 2008/0101225 A1 | 5/2008 | Tassinari et al. | |
| 2008/0168283 A1 * | 7/2008 | Penning | 713/310 |
| 2008/0205376 A1 | 8/2008 | Patmon et al. | |
| 2008/0219184 A1 | 9/2008 | Fowler et al. | |
| 2008/0294917 A1 * | 11/2008 | Khan et al. | 713/310 |
| 2009/0070603 A1 * | 3/2009 | Diab et al. | 713/300 |
| 2009/0228722 A1 * | 9/2009 | Lin | 713/300 |
| 2010/0299544 A1 * | 11/2010 | Hansalia | 713/320 |
| 2010/0325449 A1 * | 12/2010 | Biederman et al. | 713/300 |

* cited by examiner

*Primary Examiner* — Raymond Phan

(57) ABSTRACT

A local area network system includes switching circuitry and in-band data ports under control of the switching circuitry. Device management circuitry is configured to manage the local area network device and system power is configured to provide power to the switching circuitry and the device management circuitry. An out-of-band data port is coupled to the device management circuitry. The out-of-band data port is supplied with a Power-over-Ethernet supply.

21 Claims, 4 Drawing Sheets

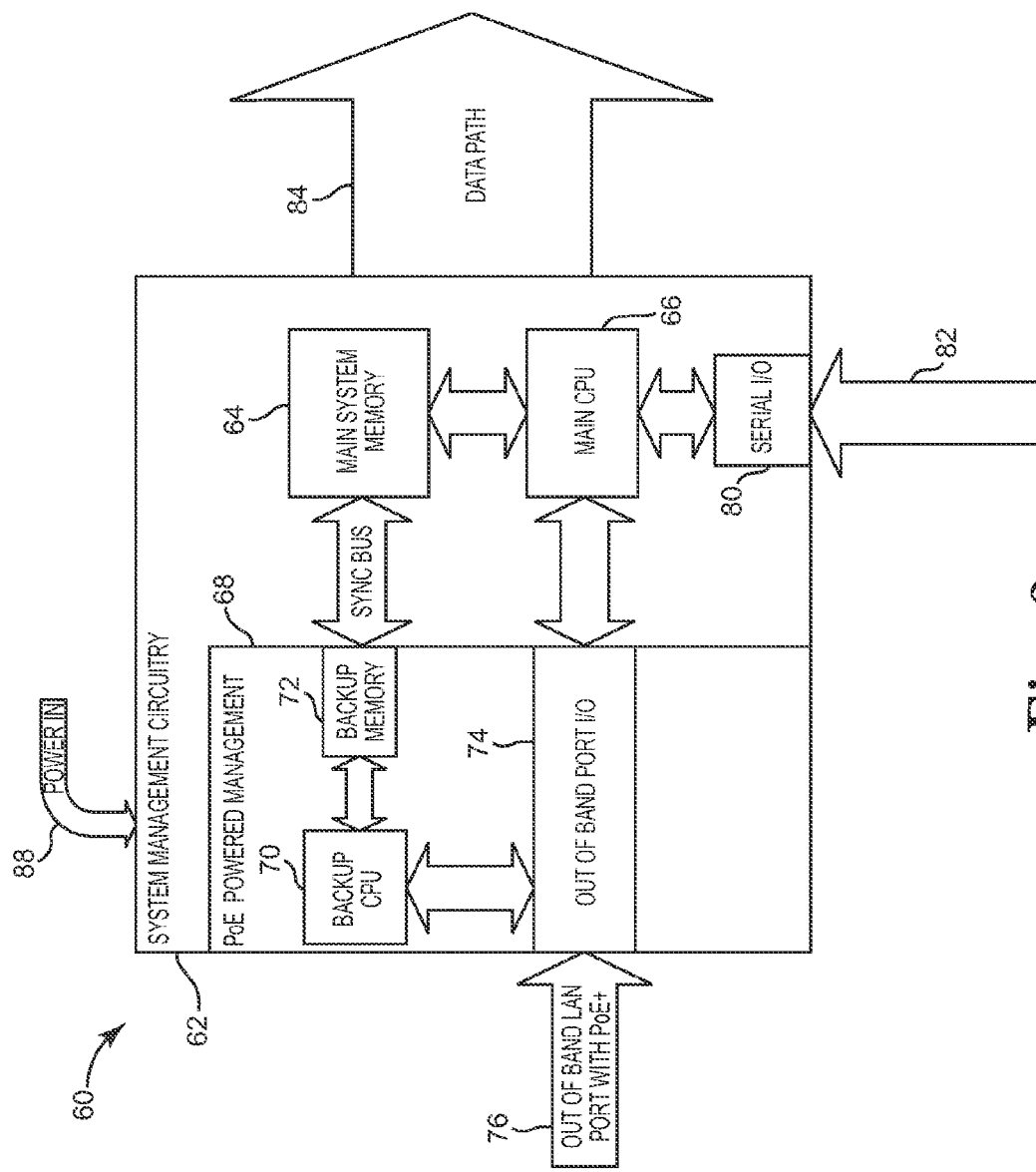

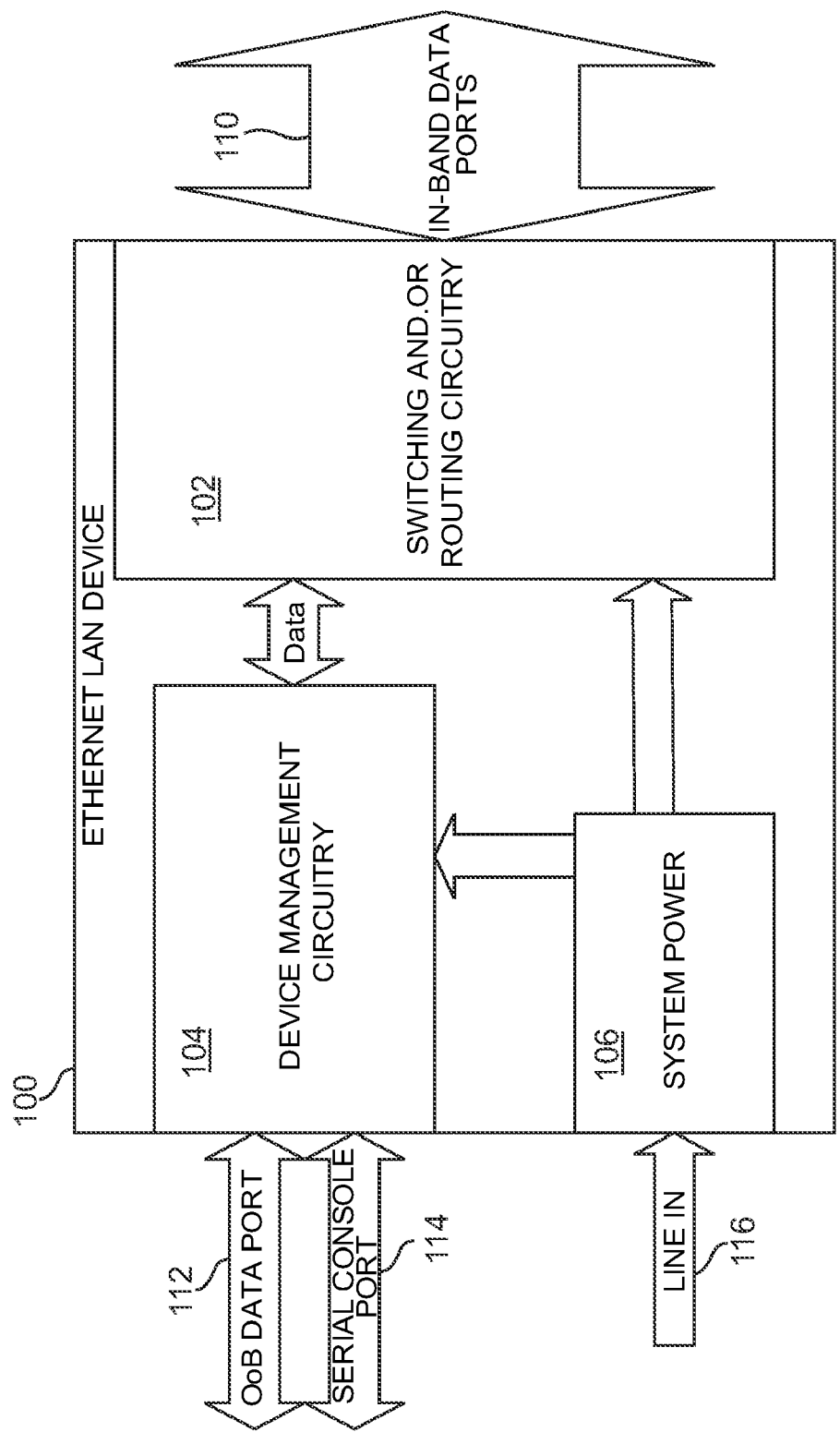

POE POWERED MANAGEMENT CIRCUITRY USING OUT-OF-BAND DATA PORT

BACKGROUND

The present invention relates to networking and communications technology over a network system, such as a local area network (LAN). A LAN is typically located in a particular physical area, such as a building, in which computers and other network devices are linked, usually via a wiring-based cabling scheme. A LAN typically includes a shared medium to which workstations attach and through which they communicate.

In some instances, LAN devices rely on local power sources in order to provide full functionality. In some instances where the local power source fails, it can be difficult to assess the cause of the failure, especially from a remote location. For these and other reasons, there is a need for the present invention.

BRIEF DESCRIPTION OF THE DRAWINGS

FIG. 3 is a block diagram illustrating LAN system with PoE powered management.
FIG. 4 is a block diagram illustrating LAN system with PoE powered management.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
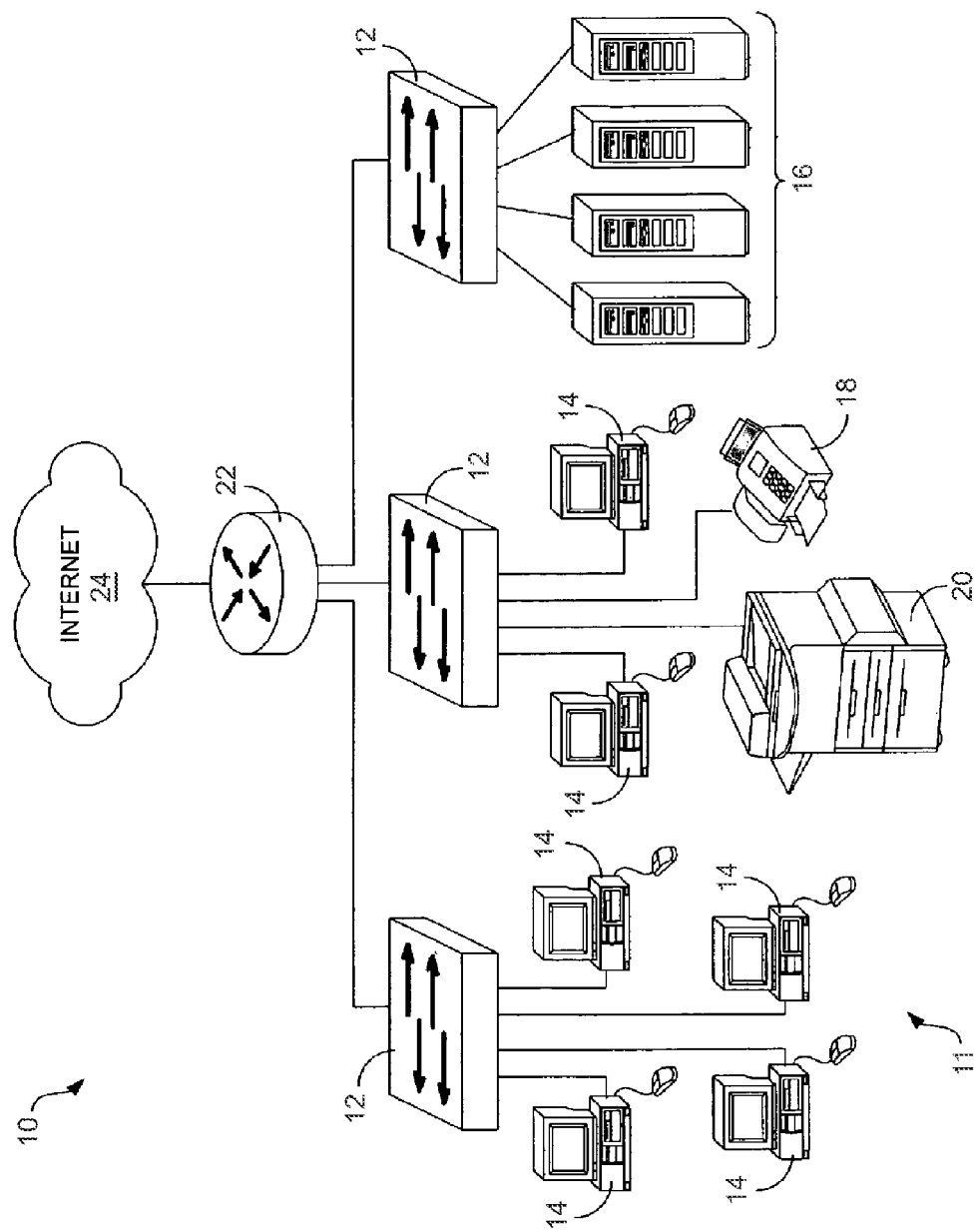
FIG. 1 is a block diagram illustrating a network system.

FIG. 1 illustrates an example network system 10. System 10 includes multiple client devices 11 that are connected to multiple LAN devices 12 within a local area network (LAN). Client devices 11 can include any type of network-enabled device, that is, a device that is configured to connect to and communicate over a computer network.

In the example arrangement shown in FIG. 1, client devices 11 include client computers 14, server computers 16, peripheral paper-handling equipment 20 (e.g., printer/photocopier), and an Internet Protocol (IP) telephone/digital sender 18. It is to be understood that those client devices 11 are mere examples and are only illustrated for purposes of illustration.

LAN devices 12 are configured to bridge network segments and, in the example of FIG. 1, are each connected to a router 22, which is in turn connected to the Internet 24 or some other network. Such other networks can comprise, for instance, a further LAN or a wide area network (WAN).

Figure 2:
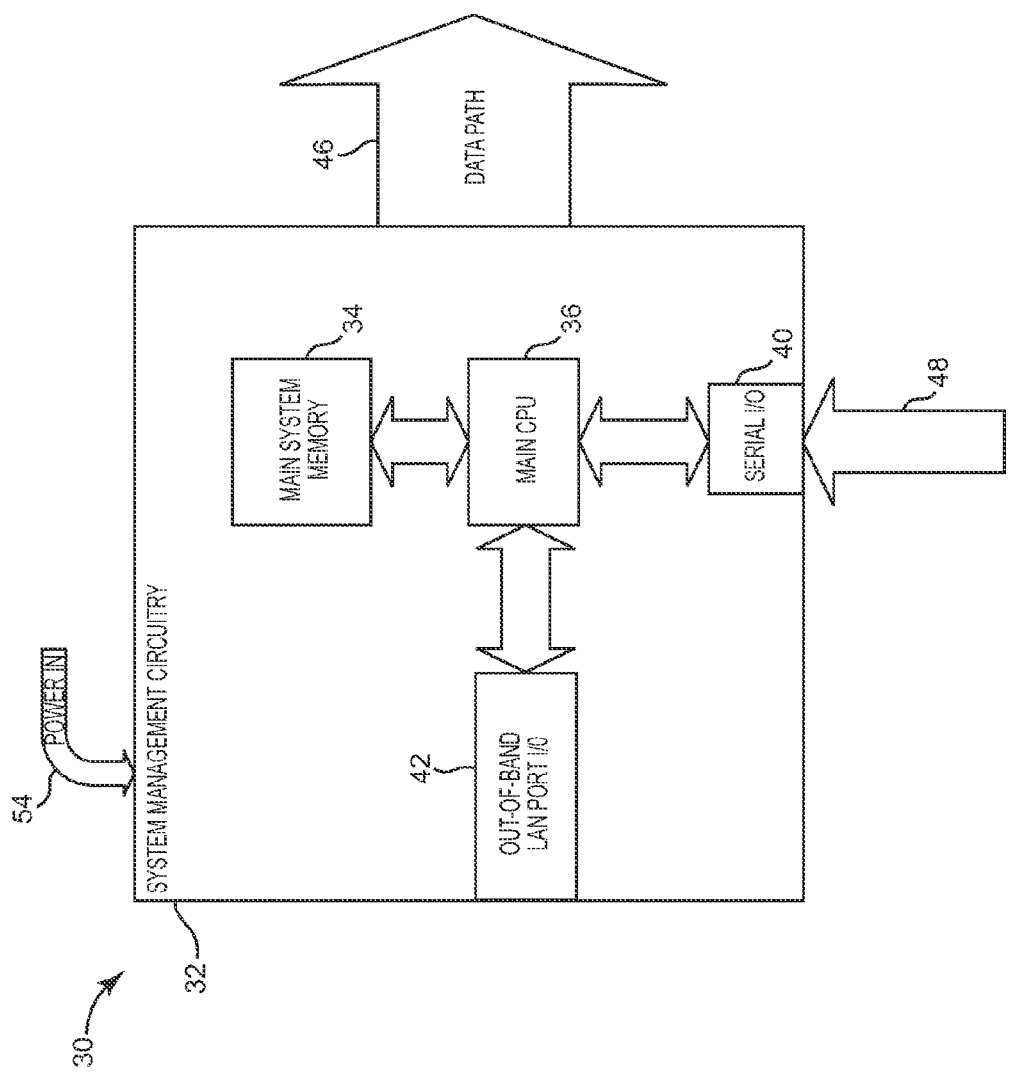
FIG. 2 is a block diagram illustrating an LAN system.

FIG. 2 illustrates LAN device 30. LAN device 30 includes system management circuitry 32, main system memory 34, and main central processing unit (CPU) 36. In one example, LAN device 30 can be used in a network system, such as network system 10 in FIG. 1, to facilitate moving and switching data between client devices. In one embodiment, LAN device 30 illustrates a switching device such as LAN device 12, and in another, illustrates a routing device such as router 22. LAN device 30 can be a card plugged into a main chassis or may be part of a network device.

In one example, LAN device 30 is powered by power in 54, which can be any of a variety of power sources. In one case, power in 54 is an AC power source. Main CPU 36 is coupled to main system memory 34 and controls data communication between LAN device 30 and other devices with which it is networked.

LAN device 30 has ports for facilitating communication with other devices. Data path 46 provides a data path between LAN device 30 and in-band LAN ports. Serial port I/O 40 is coupled to main CPU 36 for processing communications received over serial console 48. Out-of-Band (OoB) LAN port I/O 42 is also coupled to main CPU 36 and is configured to receive communications via port 42.

In operation, data path 46 is used to communicate with the rest of the network system including the in-band LAN ports. Out-of-Band LAN port I/O 42 is used to access the management operations in LAN device 30. OoB LAN port I/O 42 has similar characteristics to in-band LAN ports accessible via data path 46 in that it is also an Ethernet LAN port, but OoB LAN port 42 is restricted in the sense that it does not allow packets and data from the in-band LAN ports. In-band data is not allowed to be transmitted or received on out-of-band LAN port 42. Instead, OoB LAN port 42 is used only for access to management operations within main CPU 36.

In some instances, it is useful to have a logical or physical isolation or separation between the in-band LAN ports and out-of-band LAN ports, especially for security reasons. Some applications provide a physically isolated topology around the management of the switch LAN device 30 (and thus, out-of-band LAN port 42), whereas the data switching through (and thus, the in-band LAN ports) can be more accessible.

Typically, power in 54 provides power for the entire LAN device 30, including for its data switching through the in-band LAN ports, as well as for its management operations. As such, in the case of a power failure at power in 54 or a failure in the power supply within the chassis the entire LAN device 30 will simply drop from the view a network administrator. In many instances, there is no indication as to why LAN device 30 went off line, such that the network administrator then has to undertake debugging steps to understand the underlying problem. In situations where LAN device 30 is the only network device located at a remote site, it is particularly difficult to ascertain the cause of the failure.

In some cases, an alternate power source to power in 54 can be provided to LAN device 30. This can be accomplished by using either redundant fixed power sources, External Power Supplies (EPS), or by battery sourced power. Providing more capability, however, generally will have greater expense, complexity, power consumption, heat generation and space utilization.

Furthermore, in order to be effective, the EPS solution must be plugged into a different electrical circuit than the main power source. This requires a second power feed, which can be costly to provide. The EPS device also requires more space and generates some additional heat.

Similarly, battery back-up systems carry acquisition costs and require additional space. Though they can be run on the same circuit as the primary power to the device being protected, they have a finite power sourcing capacity. Further, the batteries require periodic replacement, which adds to the cost of this solution.

FIG. 3 illustrates LAN device 60 in accordance with one embodiment. LAN device 60 includes system management circuitry 62, main system memory 64, main central processing unit (CPU) 66, and powered management circuit 68. In one example, LAN device 60 can be used in a network system, such as network system 10 in FIG. 1, to facilitate moving and switching data between client devices. In one embodiment, LAN device 60 illustrates a switching device such as LAN device 12, and in another, illustrates a routing device such as router 22 and in others illustrates wireless access points, firewalls, and load balancers. LAN device 60 can be a card plugged into a main chassis or may be part of a network device.

In one example, LAN device 60 is powered by power in 88, which can be any of a variety of power sources. In one case, power in 88 is an AC power source. Main CPU 66 is coupled to main system memory 64 and controls data communication between LAN device 60 and other devices with which it is networked.

Powered management circuit 68 is in communication with main system memory 64 and main CPU 66 and includes backup central processing unit (CPU) 70, backup memory 72 and OoB Port I/O 74. In one embodiment, OoB Port I/O 74 is configured to receive power over Ethernet (PoE) source 76 for providing alternate power to power management circuit 68 as will be further described below.

LAN device 60 has ports for facilitating communication with other devices. Data path 84 provides a data path between LAN device 60 and the rest of the device including in-band LAN ports. Serial I/O 80 is coupled to main CPU 66 for processing communications received over serial console 82. Out-of-Band (OoB) LAN port I/O 76 is also coupled to powered management circuit 68 and is configured to receive communications via port 74.

In operation, data path 84 is used to communicate with the rest of the network system including the in-band LAN ports. Out-of-Band LAN port I/O 76 is used to access the management operations in LAN device 60. Out-of-Band LAN port I/O 76 has similar characteristics to in-band LAN ports accessible via data path 84, as it is also an Ethernet LAN port, but OoB LAN port 74 is restricted in the sense that it can only communicate with device 60 management functions and cannot send or receive packets to or from the in-band LAN ports. In-band data is not allowed to be transmitted or received on out-of-band LAN port 74. Instead, OoB LAN port 74 is used for access to management operations. In some instances, it is useful to have a logical or physical isolation or separation between the in-band LAN ports and out-of-band LAN ports.

Power in 88 provides power for management system circuitry 62, as supplied by a chassis power supply, and thereby powers its data switching through the in-band LAN ports, as well as its management operations. Furthermore, PoE source 76 provides an additional source of power to OoB LAN port I/O 74. As such, in the case of a power failure at power in 88 due to a failure of the power supply in the chassis or loss of line power, PoE source 76 provides a backup supply such that powered management circuit 68 maintains a at least a limited amount of functionality. In one embodiment, PoE source 76 provides enough backup supply to powered management circuit 68 so that it maintains sufficient management functionality to have diagnostic capability in LAN device 60. In this way, a remote network administrator is able to differentiate between a switch that crashed, a software lock up, when there is a hardware failure of some kind, or when there is a main power failure. In some embodiments, it is possible for powered management circuit 68 to maintains full functionality.

In one embodiment, backup memory 72 in powered management circuit 68 synchronizes with main memory 64 on a periodic basis. As such, in the event of a power failure at power in 88, backup CPU 70 can remain powered up via OoB LAN port 74, which in turn is powered by PoE source 76. Backup CPU 70 can then interface with backup memory 72 and allow diagnosis of the status of LAN device 60 prior to the power failure. Even where power in 88 remains disabled, a network administrator can still access backup CPU 70 and backup memory 72 via OoB LAN port 74, which remains powered with PoE source 76.

In one embodiment, system management circuitry 62 uses traditional methods for accessing the management operations such as Simple Network Management Protocol (SNMP), HTTP and Telnet. For example, SNMP Management Information Base (MIB) is defined by Internet standards and organizes data that a user might want to see, such as log entries, system run time, etc. Such information stored in main memory 64 is synchronized into backup memory 72 and can be accessed there for diagnosis.

Once power in 88 fails, main CPU 66 and thus main memory 64 are without power and thus disabled. As such, remote diagnostics would not possible if using main CPU 66 and main memory 64. Powered management circuit 68, however, provides a debugging interface by supplying power via a Power-over-Ethernet interface. Information that would normally be available via main memory 64 is instead accessed in backup memory 72, even under power in 88 failure conditions.

In one embodiment, PoE source 76 can supply up to 30 watts of PoE power for use by powered management circuit 68. In one example, power level PoE is provided at 15 W, and in another, power level PoE+ at 30 W is provided. Depending on the power needs of powered management circuit 68, it may be possible to maintain full functionality of the management operations. However, it may be necessary in some embodiments to build in alternate circuitry to operate at a reduced level of functionality to match the power level PoE (at 15 W) or PoE+ (at 30 W) can provide.

Because many different LAN devices include a single Ethernet port located on the management circuitry, which is dedicated to management of the device, such LAN devices are readily adaptable to LAN device 60 in accordance with the embodiment described. Utilizing Power-over-Ethernet (PoE/PoE+) technology makes the management circuitry a PoE powered device capable of drawing power from the dedicated LAN port. Adding powered management circuit 68 allows diagnostic capabilities even where there is power failure of a local power source of the LAN device.

LAN device 60 is relatively cost effective and easy to deploy. Management circuitry powered by PoE adds less to the cost of the chassis than the cost of external redundant power sources or RPS solutions. For customers that do not require the highest level of protection from faults, LAN device 60 will cost substantially less than alternatives of providing redundant power supplies. Furthermore, because there is relatively little equipment, there is greater simplicity for the customer in managing LAN device 60.

Furthermore, LAN device 60 can avoid some of the secondary costs that are associated with the RPS solution. In order to provide true protection from power loss, the backup power source must at a minimum be connected to a line sourced from a circuit that is different than the main source. In a small wiring closet, this typically requires installation of a second power source. For LAN device 60, the power is sourced from a device that can be up to 100 meters away and may already be on a different circuit. While this does not provide the same protection as a redundant power circuit, it's a viable alternative to providing diagnostic capability in power failed chassis.

FIG. 4 illustrates LAN device 100 in accordance with one embodiment. LAN device 100 includes switching or routing circuitry 102, device management circuitry 104, and system power 106. In one example, LAN device 100 can be used in a network system, such as network system 10 in FIG. 1, to facilitate moving and switching data between client devices. In one embodiment, LAN device 100 illustrates a switching device such as LAN device 12, and in another, illustrates a routing device such as router 22 and in others illustrates wireless access points, firewalls, and load balancers. LAN device 100 can be a card plugged into a main chassis or may be part of a network device.

In one example, LAN device 100 is powered by system power 106, which can be supplied by any of a variety of power sources. In one case, line in 116 is an AC power source for system power 106. System power 106 is then coupled to switching or routing circuitry 102 and device management circuitry 104, and provides power to them.

Switching or routing circuitry 102 is coupled to in-band data ports 110 and controls data communication between LAN device 100 and other devices with which it is networked. LAN device 100 has ports for facilitating communication with other devices. Serial console port 114 is coupled to main management circuitry 104 for processing received management communications. Out-of-Band (OoB) data port I/O 112 is also coupled to management circuitry 104 and is configured to receive communications. In one embodiment, OoB data port 112 is configured to receive power over Ethernet (PoE) to provide alternate power to device management circuitry 104 as will be further described below.

In operation, switching or routing circuitry 102 is coupled to in-band data ports 110 and controls data communication between LAN device 100 and other devices with which it is networked. Serial console port 114 is used to access the management operations in LAN device 100. OoB data port 112 is configured to provide PoE power to device management circuitry, but is restricted in the sense that it can only communicate with device 100 management functions and cannot send or receive packets to or from the in-band LAN ports.

System power 106 provides power for device management circuitry 102 and switching or routing circuitry 102 and thus, powers data switching through the in-band LAN ports as well as management operations. Furthermore, OoB data port 112 provides an additional source of power to device management circuitry 104. As such, in the case of a power failure at system power in 106 due to a malfunction there or failure of the line in 116 power supply in the chassis or other loss of line power, OoB data port 112 provides a backup supply such that device management circuitry 104 maintains a limited amount of functionality. In one embodiment, OoB data port 112 provides enough backup supply to device management circuitry 104 so that it maintains sufficient management functionality to have diagnostic capability in LAN device 100. In this way, a remote network administrator is able to differentiate between a switch that crashed, a software lock up, when there is a hardware failure of some kind, or when there is a main power failure.

Once system power in 106 fails, switching or routing circuitry 102 is without power and thus disabled. As such, remote diagnostics would not possible using switching or routing circuitry 102. Device management circuitry 104, however, provides a debugging interface by supplying power via a Power-over-Ethernet interface. Information that would normally not be available under failure of system power 106 is now accessed even under system power 106 failure conditions via PoE provided to device management circuitry 104.

In one embodiment, a PoE source to OoB data port 112 can supply up to 30 watts of PoE power for use by device management circuitry 104. In one example, power level PoE is provided at 15 W, and in another, power level PoE+ at 30 W is provided. Depending on the power needs of device management circuitry 104, it may be possible to maintain full functionality of the management operations. However, it may be necessary in some embodiments to build in alternate circuitry to operate at a reduced level of functionality to match the power level PoE (at 15 W) or PoE+ (at 30 W) can provide.

LAN device 100 is relatively cost effective and easy to deploy.

Management circuitry powered by PoE adds less to the cost of the chassis than the cost of external redundant power sources or RPS solutions. For customers that do not require the highest level of protection from faults, LAN device 100 will cost substantially less than alternatives of providing redundant power supplies. Furthermore, because there is relatively little equipment, there is greater simplicity for the customer in managing LAN device 100.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A local area network device comprising:
   switching circuitry;
   in-band data ports under control of the switching circuitry;
   device management circuitry configured to manage the local area network device;
   system power configured to provide power to the switching circuitry and the device management circuitry; and
   an out-of-band data port coupled to the device management circuitry, the out-of-band data port supplied with a Power-over-Ethernet supply.

2. The local area network device of claim 1, wherein the device management circuitry is configured to be accessible via out-of-band data port even where system power in the local area network device fails.

3. The local area network device of claim 1, wherein the device management circuitry further comprises a backup memory and a backup central processing unit.

4. The local area network device of claim 1, wherein the in-band data port and the out-of-band data port are physically isolated.

5. A local area network device comprising:
   a main memory and a main central processing unit coupled to the main memory;
   an in-band data port under control of the main central processing unit for transmitting data;
   a powered management circuit in communication with the main memory; and
   an out-of-band data port coupled to the powered management circuit, the out-of-band data port supplied with a Power-over-Ethernet supply to the out-of-band data port.

6. The local area network device of claim 5, wherein the powered management circuit is configured to be accessible via out-of-band data port even where power into the local area network device fails.

7. The local area network device of claim 5, wherein the powered management circuit comprises a backup memory and a backup central processing unit.

8. The local area network device of claim 5, wherein the in-band data port and the out-of-band data port are physically isolated.

9. The local area network device of claim 5, wherein the local area network device comprises one of a group comprising a switch, a network router, a wireless access point, a firewall, and a load balancer.

10. The local area network device of claim 7, wherein the backup memory and main memory are synchronized such that the backup memory contains management status information.

11. A local area network device comprising:
a main memory and a main central processing unit coupled to the main memory;
an in-band data port under control of the main central processing unit for transmitting data;
a backup memory and a backup central processing unit coupled to each other and in communication with the main memory; and
an out-of-band data port coupled to the backup central processing unit, the out-of-band data port supplied with a Power-over-Ethernet supply to the out-of-band data port.

12. The local area network device of claim 11, wherein the backup memory and the backup central processing unit are configured to be accessible via out-of-band data port even where local power to the local area network device fails or when the chassis power supply fails.

13. The local area network device of claim 11, wherein the backup memory and main memory are synchronized such that the backup memory contains management status information.

14. The local area network device of claim 11, wherein the in-band data port and the out-of-band data port are physically isolated.

15. The local area network device of claim 11, wherein the local area network device one of a group comprising a switch, a network router, a wireless access point, a firewall, and a load balancer.

16. A method of operating a local area network comprising:
transmitting data via an in-band data port under control of a main central processing unit in conjunction with a main memory;
synchronizing a backup memory with the main memory;
powering an out-of-band data port with a Power-over-Ethernet supply; and
accessing the backup memory with a backup central processing unit powered by the out-of-band data port.

17. The method of claim 16 further comprising accessing the backup memory and the backup central processing unit via out-of-band data port when local power to the local area network device fails.

18. The method of claim 16 further comprising synchronized the backup memory and main memory such that the backup memory contains management status information.

19. The method of claim 16 further comprising physically isolating the in-band data port from the out-of-band data port.

20. The method of claim 16, wherein the local area network device is configured as a switch or network router.

21. A local area network device comprising:
switching circuitry;
in-band data ports under control of the switching circuitry;
device management circuitry configured to manage the local area network device;
a system power unit to receive power from an external source and provide power to the switching circuitry and the device management circuitry; and
an out-of-band data port coupled to the device management circuitry, the out-of-band data port to receive power via Power-over-Ethernet and provide that power to the device management circuitry to operate at least some functions of the device management circuitry upon failure of power to the system power unit.

* * * * *